US010147238B2

(12) United States Patent
Locke et al.

(10) Patent No.: US 10,147,238 B2
(45) Date of Patent: Dec. 4, 2018

(54) HOLOGRAPHIC TECHNOLOGY IMPLEMENTED RETAIL SOLUTIONS

(71) Applicant: Tyco Fire & Security GmbH, Neuhausen am Rheinfall (CH)

(72) Inventors: Robert B. Locke, Sonoma, CA (US); Paul B. Rasband, Fremont, CA (US)

(73) Assignee: Tyco Fire & Security GmbH (CH)

( * ) Notice: Subject to any disclaimer, the term of this patent is extended or adjusted under 35 U.S.C. 154(b) by 0 days.

(21) Appl. No.: 15/381,588

(22) Filed: Dec. 16, 2016

(65) Prior Publication Data

US 2018/0018824 A1   Jan. 18, 2018

Related U.S. Application Data

(60) Provisional application No. 62/361,669, filed on Jul. 13, 2016, provisional application No. 62/361,053, filed on Jul. 12, 2016.

(51) Int. Cl.
*G09G 5/00* (2006.01)
*G06T 19/00* (2011.01)
(Continued)

(52) U.S. Cl.
CPC .............. *G06T 19/006* (2013.01); *G06F 3/16* (2013.01); *G06F 17/218* (2013.01); *G06F 17/241* (2013.01); *G06F 17/2705* (2013.01); *G06Q 30/0201* (2013.01); *G10L 15/22* (2013.01); *G10L 15/26* (2013.01); *G06F 3/017* (2013.01); *G06T 19/20* (2013.01);
(Continued)

(58) Field of Classification Search
CPC ... G10L 15/26; G10L 15/22; G10L 2015/223; G10L 15/30; G06Q 30/0201; G06F 17/2705; G06F 17/241; G06F 17/218; G06F 3/16; G06F 3/017; G06T 19/006; G06T 19/20; G06T 2219/004
See application file for complete search history.

(56) References Cited

U.S. PATENT DOCUMENTS 8,965,460 B1 *   2/2015   Rao .......................... G06F 3/005
                                                                         455/566
9,721,373 B2 *   8/2017   Marsella .................. G06T 13/40
(Continued)

OTHER PUBLICATIONS

"*Microsoft HoloLens*," Wikipedia, (May 3, 2018), [Retrieved from the Internet]: https://en.wikipedia.org/wiki/Microsoft_HoloLens.
(Continued)

*Primary Examiner* — Robert Craddock
(74) *Attorney, Agent, or Firm* — Foley & Lardner LLP

(57) ABSTRACT

Disclosed are techniques that use mixed reality, e.g., augmented reality and virtual reality technologies to improve analysis of retail processes and activity in retail establishments. A server system receives images from a mixed reality device, which images including representations of physical objects and receives voice data from the mixed reality device and executes a cognitive agent to process the voice data received from the mixed reality device that generates a set of virtual objects that include data describing merchandising process concepts regarding the set of physical objects, based on input queries received in the voice data and sending by a server system, the set of virtual objects to the mixed reality device.

12 Claims, 6 Drawing Sheets

(51) Int. Cl.
*G06F 3/16* (2006.01)
*G06F 17/27* (2006.01)
*G06F 17/21* (2006.01)
*G06F 17/24* (2006.01)
*G10L 15/26* (2006.01)
*G10L 15/22* (2006.01)
*G06Q 30/02* (2012.01)
*G06F 3/01* (2006.01)
*G06T 19/20* (2011.01)
*G10L 15/30* (2013.01)

(52) U.S. Cl.
CPC ........ *G06T 2219/004* (2013.01); *G10L 15/30* (2013.01); *G10L 2015/223* (2013.01)

(56) References Cited

U.S. PATENT DOCUMENTS

| | | |
|---|---|---|
| 2005/0137890 A1 | 6/2005 | Bhatt et al. |
| 2005/0207487 A1 | 9/2005 | Monroe |
| 2011/0167010 A1 | 7/2011 | Soppera et al. |
| 2011/0213664 A1* | 9/2011 | Osterhout ............ G02B 27/017 705/14.58 |
| 2011/0225069 A1* | 9/2011 | Cramer .................. G06Q 30/06 705/27.1 |
| 2012/0242698 A1 | 9/2012 | Haddick et al. |
| 2014/0344420 A1* | 11/2014 | Rjeili ...................... H04L 43/04 709/220 |
| 2015/0317501 A1 | 11/2015 | Safai et al. |
| 2016/0209648 A1 | 7/2016 | Haddick et al. |
| 2016/0267759 A1 | 9/2016 | Kerzner |
| 2016/0269491 A1 | 9/2016 | Eom et al. |
| 2016/0316189 A1 | 10/2016 | Lee et al. |
| 2017/0090556 A1 | 3/2017 | Baba et al. |

OTHER PUBLICATIONS

Sala et al., Personal Identification Through 3D Biometric Measurements Based on Stereoscopic Image Pairs, 2006.
Office Action for U.S. Appl. No. 15/379,657, dated Jun. 28, 2018, 10 pages.
Office Action for U.S. Appl. No. 15/381,396, dated Jun. 28, 2018, 23 pages.

* cited by examiner

HOLOGRAPHIC TECHNOLOGY IMPLEMENTED RETAIL SOLUTIONS

CLAIM OF PRIORITY

This application claims priority under 35 U.S.C. § 119(e) to provisional U.S. Patent Application 62/361,053, filed on Jul. 12, 2016, entitled: "Holographic Technology Implemented Security and Retail Solutions" the entire contents of which is incorporated herein by reference and provisional U.S. Patent Application 62/361,669, filed on Jul. 13, 2016, entitled: "Holographic Technology Implemented Security and Retail Solutions the entire contents of which is incorporated herein by reference.

BACKGROUND

This description relates to operation of sensor networks such as those used with security, intrusion and alarm systems installed on commercial premises.

It is common for businesses to have systems for detecting conditions at their premises and signaling the conditions to a monitoring station or to authorized users of the security system. For example, such buildings employ systems in the areas of fire detection, smoke detection, intrusion detection, access control, video surveillance etc. Many different types of security sensors are deployed in commercial buildings. Types of sensors typically include motion detectors, cameras, and proximity sensors (used to determine whether a door or window has been opened). Such sensors can constantly collecting data that is used to determine whether an alarm should be triggered, but also continues to collect data after an alarm is triggered.

Retail establishments often use simple physical walk-throughs with users having smart-phone and/or tablet based presentations, and use conventional retail analytics applications, and verbal descriptions as tools used for analysis to investigate trends and potential explanations of observations suggested by data analytics.

Augmented reality, virtual reality and mixed reality technologies are known. Generally, virtual reality refers to technologies that replicate an environment with a simulation of a user being immersed in the replicated environment. Augmented reality, generally refers to technologies that present a view of a real-world environment augmented with computer generated data. Mixed reality a relatively new term generally involves technologies that involve a merging of real world and virtual world environments where real and virtual objects exist and interact.

SUMMARY

According to an aspect, a system includes a server system including one or more processor devices, memory in communication with the one or more processor devices, and a storage device that stores a program of computing instructions for execution by the processor using the memory. The program includes instructions configured to cause the processor to receive images from a mixed reality device, which images including representations of physical objects, receive voice data from the mixed reality device, execute a cognitive agent to process the voice data received from the mixed reality device, determine location information to determine a correspondence between the representations of the physical objects in the images and stored information concerning the set of physical objects, generate a set of virtual objects that include data describing merchandising process concepts regarding the set of physical objects, based on input queries received in the voice data and send the set of virtual objects to the mixed reality device.

Aspects also include computer program products and methods.

Disclosed are techniques that use mixed reality and/or augmented reality and virtual reality technologies to improve the analysis of retail processes and activity in retail establishments. The disclosed techniques use computer implemented techniques that obtain information from various electronic systems/devices in the physical world, which devices are exemplified by security systems, and merge that information into a virtual world of policies and analytics that involve retail systems that generate analytical information regarding customers and their preferences and needs. This improves upon simple physical walk-throughs blended with smart-phone and tablet based presentations, conventional retail analytics apps, and verbal descriptions. In many cases the main tools of such analysis are limited to emails and spreadsheets. Using these conventional methods it is very time consuming and difficult, or even impossible, to investigate trends and potential explanations of observations suggested by data analytics.

The details of one or more embodiments of the invention are set forth in the accompanying drawings and the description below. Other features, objects, and advantages of the invention is apparent from the description and drawings, and from the claims.

DETAILED DESCRIPTION

Figure 1:
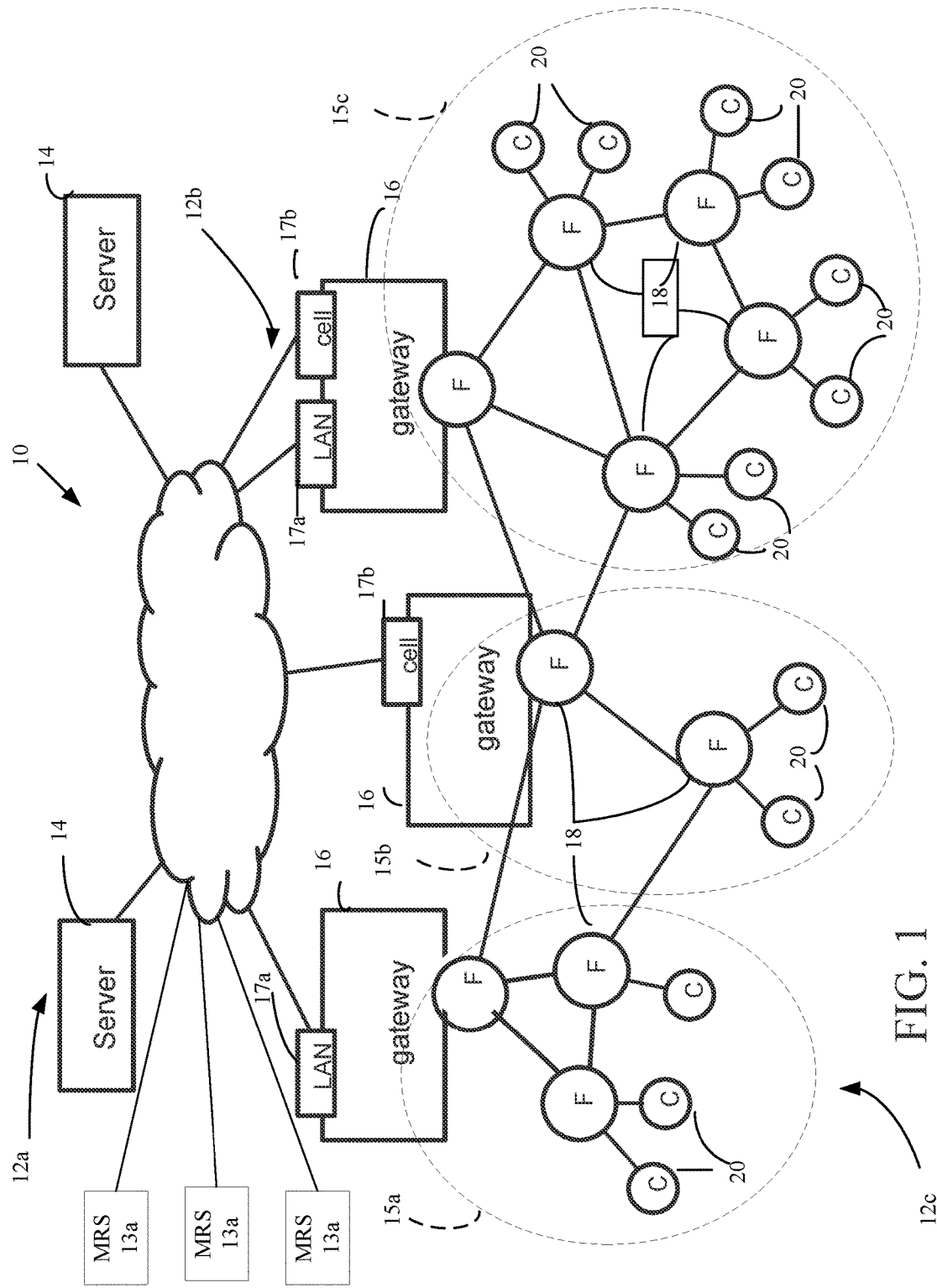
FIG. 1 is a schematic diagram of an exemplary networked security system.

As shown in FIG. 1, described herein are examples of an integrated platform 10 that integrates via a distributed network 11, mixed reality devices 13*a*-13*c* with security/intrusion/alarm/surveillance systems 15*a*-15*c* (typically including sensors 20, functional nodes 18 and typically including a panel not shown).

Examples of mixed reality devices 13*a*-13*c* are those in which the mixed reality devices incorporate a live, real world presentation of elements of the physical real-world with virtual elements that are calculated or produced from inputs and which are rendered on a display so that to a user these calculated or produced elements are perceived to exist together with the physical real world in a common environment. Examples of such mixed reality devices 13*a*-13*c* include mixed reality devices such as Hololens® (Microsoft), (a smart-glasses, cordless, Windows 10® (Microsoft) computer headset that includes various sensors and a high-definition stereoscopic 3D optical head-mounted display, and spatial sound to allow for augmented reality applications. Other mixed reality devices/augmented reality systems such as Google Glass® (Google) could be used. There are many such systems on the market of which these are two examples.

The security systems 15a-15c typically include a panel (not shown), such as for an intrusion detection system, an intrusion detection panel wired or wirelessly connected to a variety of sensors deployed in a premises. Typically, such panels receive signals from one or more of these sensors to indicate a current state or value or that a particular condition being monitored has changed or become unsecure.

The integrated platform 10 includes data collection systems that are coupled to wireless sensor networks and wireless devices, with remote server-based monitoring via servers 14 and report generation. As described in more detail below, wireless sensor networks generally use a combination of wired and wireless links between computing devices, with wireless links usually used for the lowest level connections (e.g., end-node device to hub/gateway 16). In an example network, the edge (wirelessly-connected) tier of the network is comprised of resource-constrained devices 20 with specific functions. These devices 20 may have a small-to-moderate amount of processing power and memory, and may be battery powered, thus requiring that they conserve energy by spending much of their time in sleep mode. A typical model is one where the edge devices 20 generally form a single wireless network in which each end-node communicates directly with its parent node (e.g., 18) in a hub-and-spoke-style architecture. The parent node may be, e.g., an access point on a gateway or a sub-coordinator which is, in turn, connected to the access point or another sub-coordinator.

In FIG. 1, the distributed network 11 is logically divided into a set of tiers or hierarchical levels 12a-12c. The mixed reality devices 13a-13n are shown in communication with the top one or two tiers or hierarchical levels 12a-12c. In FIG. 1, the lower level tier 12c is illustrated divided into different premises 19a-19c for ease in explaining details of the applications that will be discussed below. The premises 19a-19c are each associated with one of the security systems 15a-15c. The security systems can be independent meaning that there are no connections (as shown) among fully functional nodes of different premises or dependent meaning that there are connections (not shown) among fully functional nodes of different premises.

Figure 4:
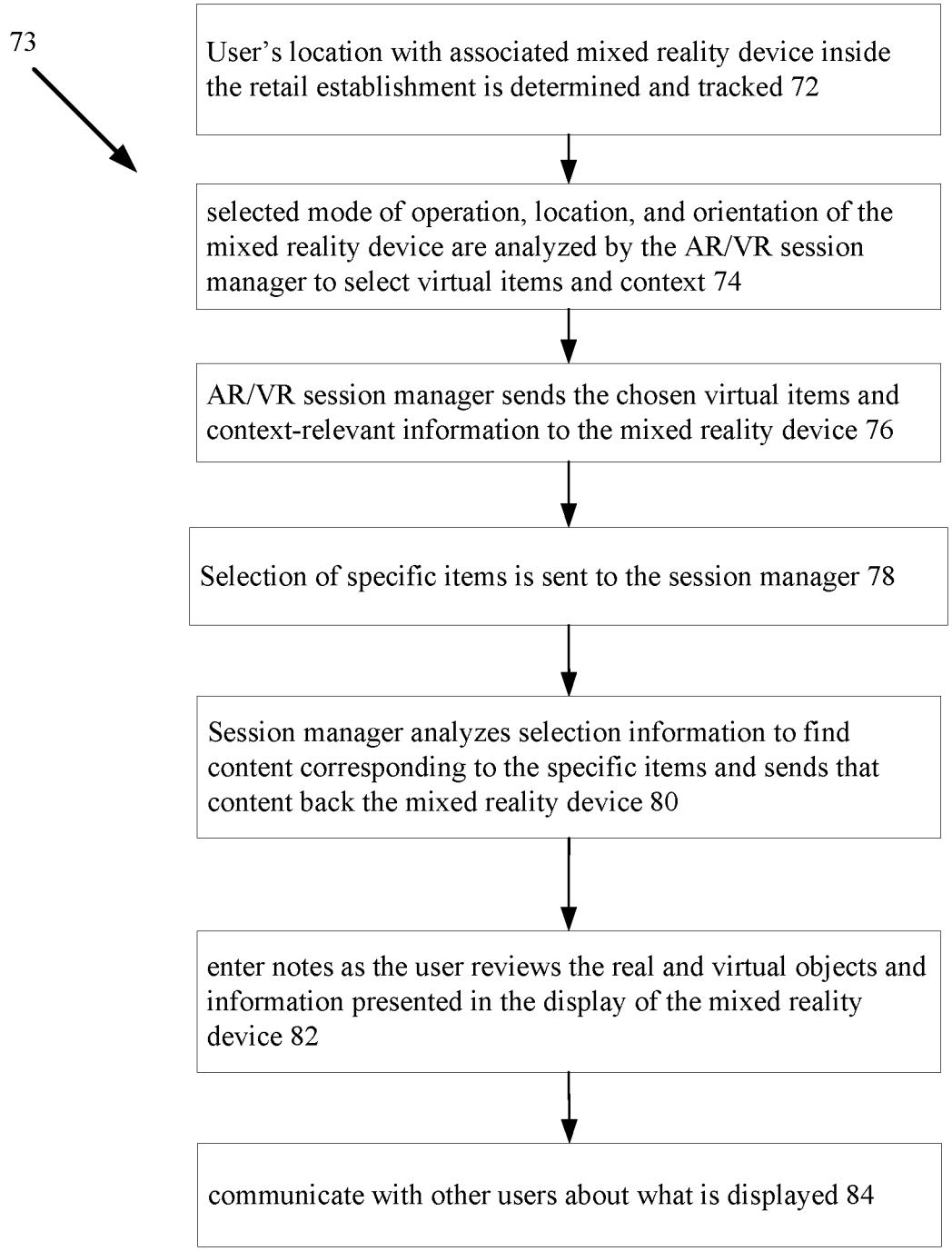
FIG. 4 is a flow chart of an embodiment of a sales promotion application.

In the upper tier or hierarchical level 12a of the network are disposed servers and/or virtual servers 14 running a "cloud computing" paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 11 has direct links between devices (nodes) as shown and discussed below. Servers 14 execute analytics (analysis programs of various sorts) that are managed in concert with a session manager system 80 (FIG. 4). The servers 14 can access a database 23.

The second logically divided tier or hierarchical level 12b, referred to here as a middle tier, involves gateways 16 located at central, convenient places inside individual buildings and structures, e.g., 13a-13c. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b. Each gateway is equipped with an access point (fully functional node or "F" node) that is physically attached to that access point and that provides a wireless connection point to other nodes in the wireless network. The links (illustrated by lines not numbered) shown in FIG. 1 represent direct (single-hop MAC layer) connections between devices. A formal networking layer (that functions in each of the three tiers shown in FIG. 1) uses a series of these direct links together with routing devices to send messages (fragmented or non-fragmented) from one device to another over the network.

The distributed network topology also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F") as well as constrained wireless sensor nodes or sensor end-nodes 20 (marked in the FIG. 1 with "C"). In some embodiments wired sensors (not shown) can be included in aspects of the distributed network 11.

The distributed network 11 implements a state machine approach to an application layer that runs on the lower tier devices 18 and 20. States in the state machine are comprised of sets of functions that execute in coordination, and these functions can be individually deleted or substituted or added to in order to alter the states in the state machine of a particular lower tier device. The state function based application layer uses an edge device operating system that allows for loading and execution of individual functions (after the booting of the device) without rebooting the device (so-called "dynamic programming"). In other implementations, edge devices could use other operating systems provided such systems allow for loading and execution of individual functions (after the booting of the device) preferably without rebooting of the edge devices.

Figure 2:
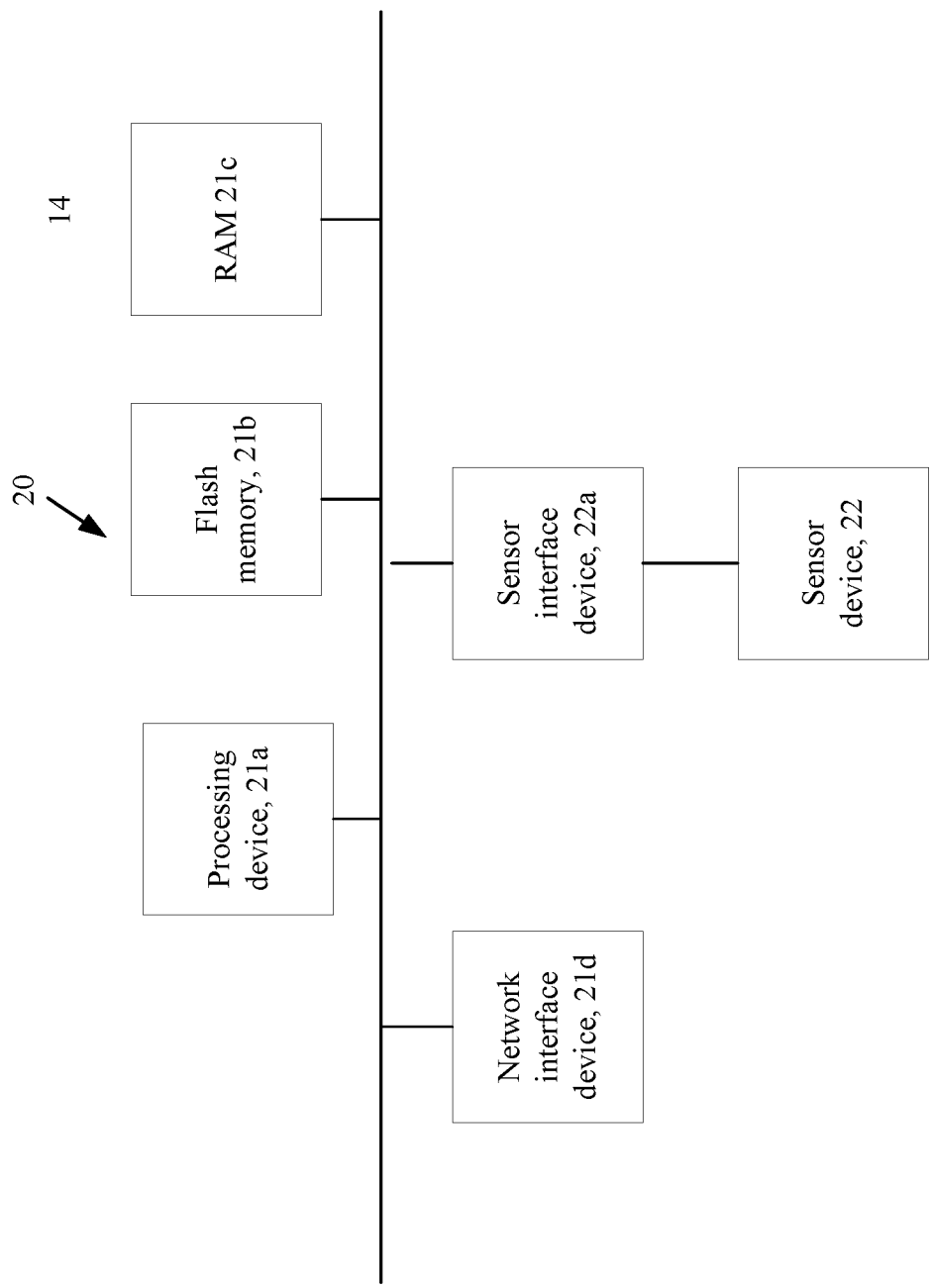
FIG. 2 is a block diagram of constrained device.

Referring to FIG. 2, a generic constrained computing device 20 that is part of the security/intrusion/alarm/surveillance systems (either integrated examples of such system or standalone examples) is shown. A constrained device 20 as used herein is a device having substantially less persistent and volatile memory other computing devices, sensors, systems in a particular networked detection/sensor/alarm system. Constrained device 20 includes a processor device 21a, e.g., a CPU and or other type of controller device that executes under an operating system, generally with 8-bit or 16-bit logic rather than the 32- and 64-bit logic used by high-end computers and microprocessors. The constrained device 20 has a relatively small flash/persistent retail establishment 21b and volatile memory 21c in comparison with other the computing devices on the network. Generally the persistent retail establishment 21b is about a megabyte of storage or less and volatile memory 21c is about several kilobytes of RAM memory or less.

The constrained device 20 has a network interface card 21d that interfaces the constrained device 20 to the network 11. Typically a wireless interface card is used, but in some instances a wired interface could be used. Alternatively, a transceiver chip driven by a wireless network protocol stack (e.g., 802.15.4/6LoWPAN) can be used as the (wireless) network interface. These components are coupled together via a bus structure. The constrained device 20 also includes a sensor 22 and a sensor interface 22a that interfaces to the processor 21a. Sensor 22 can be any type of sensor type device. Typical types of sensors include temperature, simple motion, 1- 2- or 3-axis acceleration force, humidity, pressure, selective chemical, sound/piezo-electric transduction, and/or numerous others, implemented singly or in combination to detect complex events.

The disclosed implementations of a constrained device 20 can follow the current constraints on flash/persistent storage memory and RAM memory and less than 10-20 kilobytes of RAM/volatile memory, but can have more depending on configuration and in some instances the operating system. These constrained devices 20 are configured in this manner; generally due to cost/physical configuration considerations. These types of constrained devices 20 generally have a static software image (i.e., the logic programmed into the constrained device is always the same).

Constrained devices 20 execute a real-time operating system that can use dynamic programming and support. The real-time operating system ("RTOS") executes and otherwise manages a dynamic set of user-defined independent executable functions or tasks that are either built into a loaded image (software and RTOS that executes on the constrained device) or that are downloaded during normal operation of the constrained device 20 or a combination of the two, with the former (built into the image) using as subroutines instances of the latter (downloaded during operation). Certain of the applications set forth below will cause systems to access these constrained devices 20 to upload data and otherwise control the devices 20 according to needs of the applications.

In the examples below, a facility can be any type but is typically, e.g., a commercial, industrial, facility, with interior areas, (buildings) and exterior areas that are subject to surveillance and other types of monitoring. The buildings can be of any configuration, wide open spaces such as a warehouse, to compartmentalized facilities such as labs/offices.

The retail establishment includes the plural sensors 22 (FIG. 1). In one implementation, a portion of the sensors 22 are r.f., hot spots or the like through which Wi-Fi or other Internet access services are provided. Sensors 22 that are hot spots or the like capture information, as a user moves about the retail establishment from the user's possession of the mixed reality device 13a, as will be discussed in further detail below.

Described now are techniques that allow the user of the mixed reality device 13a (an augmented reality/virtual reality (AR/VR) device 13a) to interact with the physical environment of the retail establishment, such as the retail items on the retail establishment's shelves, aisles between shelves, and spaces in and around the retail establishment, together with "virtual" items such as data objects that describe merchandising, promotions, inventory shrinkage, and other retail process concepts, in a unified and simplified way.

A user of the mixed reality device 13a may walk through a retail establishment, examine physical items on retail establishment shelves, and at the same time (via the processing 40 (discussed below) that integrates retail-based analytical processing with mixed reality system technology) will observe visual representations of results of execution of the retail-based analytically processing. These result can be ubiquitous, meaning many or an abundant number of such execution results.

Examples of such results can be so called "shrinkage levels" for the item or category of items over a selected period of time, "foot traffic," "dwell time," "conversion," and other retail-related data in specific areas of the retail establishment (e.g., the aisle passing by a particular retail item display) as a function of sales promotions of the item. Other examples include the visual representation of the correlation of sales between the physical item in view and other items in the retail establishment or available online. Still other examples include a correlation of profit of the particular item to profit of other items, etc.

The mixed reality device 13a facilitates coordination of communication between two or more individuals discussing (in close proximity to each other in the retail establishment, or via remote communications) retail establishment processes, specific retail items, retail establishment layout issues, and so forth.

Some implementations include a cognitive agent (artificial intelligence based assistant or "information retrieval and analytics" assistant) that when used in conjunction with the mixed reality device 13a can produce a more powerful analysis tool. For example, the user may look at an item on the retail establishment shelf while the AR/VR platform displays virtual objects (like pie charts, graphs, tables, etc.) giving sales, shrinkage, merchandising, and other retail information related to that item, and at the same time the user may (using natural spoken language) query the potentially large collection of backend information systems by asking the cognitive agent simple questions related to the real and virtual objects on display. The cognitive agent using a web service (or other forms of database access methods, its own internal structures like representations of episodic memory, domain knowledge bases, lexicons, and also external service accessible) includes analysis engines to answer questions from the user. The combination of mixed reality device 13a and AI agent gives the user a very powerful analysis tool stimulated by an initial visual input of objects in the physical world (i.e., natural inspection of items in view and conversations with others and/or questions to the platform).

Figure 3:
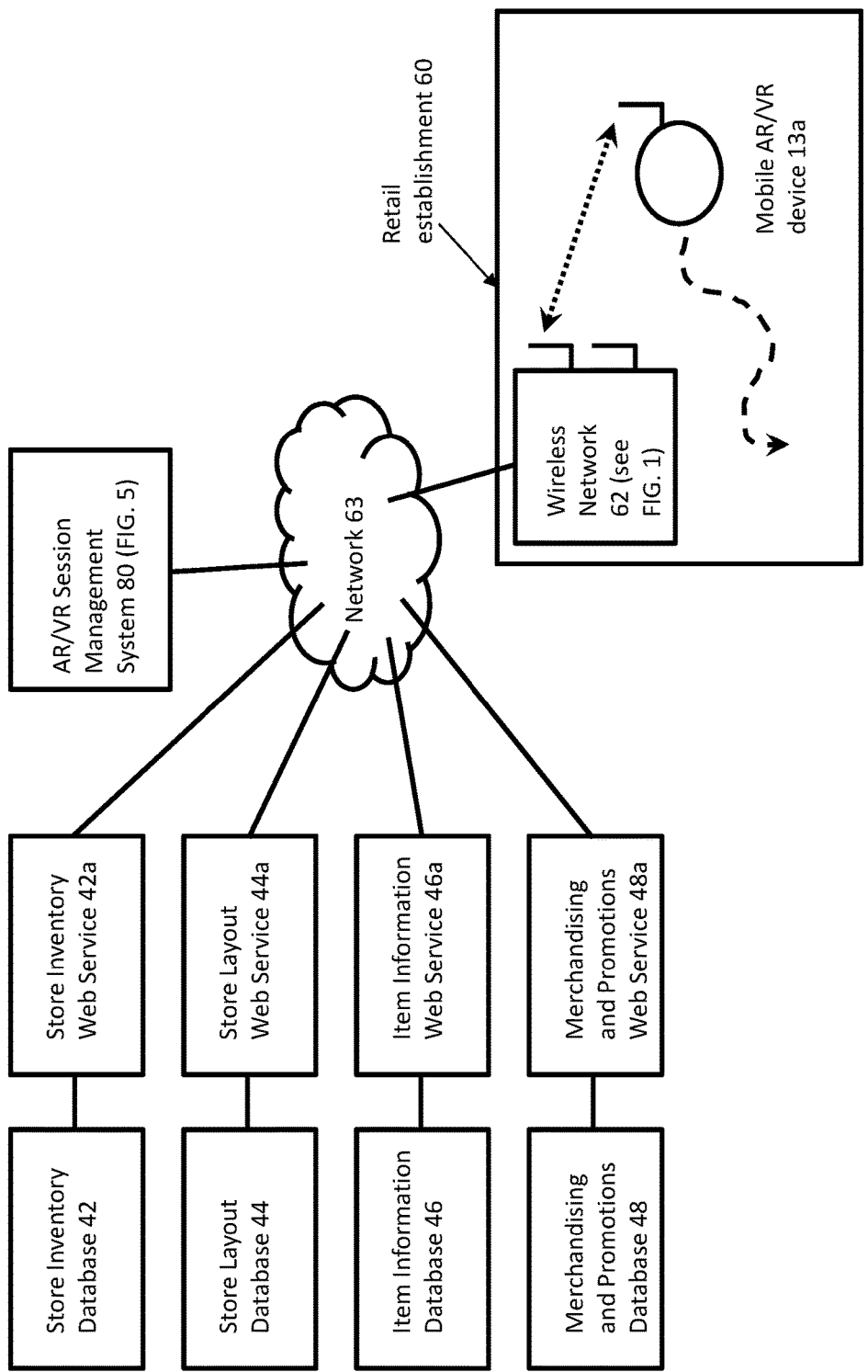
FIG. 3 is a block diagram depicting a sales promotion system integrated with a mixed reality system.

Referring to FIG. 3, a sales promotion system 40 as shown includes plural databases. The system 40 is configured to execute a sales promotion application 70 (further described in FIG. 4). A first database, store inventory database 42, in system 40 is shown as containing data on retail items, including item name, SKU number, retail price, wholesale price, location in the retail establishment (aisle no., shelf no., slot no., planogram reference no., etc.), number of items in stock, number of items on order, expected arrival date for ordered stock, inventory turnover for the item, and any other data associated with a given retail item. Store inventory database 42 is connected to the Internet 63 (or a private network), via store inventory web services 42a.

The system 40 also includes other databases that include retail establishment layout information (store layout database 44) including retail planograms, fixture locations, layout codes and/or layout version names for each retail establishment address, historical and future planned changes in layout, etc. (connected to the Internet 63 via store layout web service 46a) The store layout database 44 could also include the layout of the same aisle of location for the same retailer's retail establishments that have the same configuration and demographics with the highest performance, as measured in different ways.

The system 40 also includes an item information database 46 (connected to the Internet via item information web service 46a) and having photo images or icon representations of retail items, retail establishment shelf layouts, and other retail related objects. Retail establishment performance data, personnel information, and other retail operations and merchandise data can be stored in a merchandizing and promotions database 48 connected to the Internet 63 via merchandizing and promotions web service 48a.

In addition, the system 40 includes a mobile AR/VR (augmented reality/virtual reality) device, e.g., mixed reality device 13a, an AR/VR session management system 80, and a wireless (e.g., Wi-Fi) network 62 with wireless access points such as that shown above in FIG. 1, within the retail establishment 60. Other implementations of such networks could be used.

The organization of the databases in FIG. 3 are given as examples and are somewhat simplified relative to the design and implementation of actual enterprise-scale retail databases encountered in the commercial world. That is, no attempt is made in the figure to show how the databases are fragmented and deployed for data redundancy, scalability, fast data access, and so forth. Also, the segregation of various types of data into separate databases is simplified in FIG. 3 and it should be recognized that other database architectures can be imagined which are compatible with and included as additional embodiments.

The mixed reality device 13a, e.g., an "AR/VR device" (augmented reality' virtual reality) allows the user to see the real environment with data or "artificial images" imposed on a view of the real environment. Microsoft HoloLens and Google Glass are examples of commercial devices which allow this mixing of "real" and "virtual" realities as referred to herein also as mixed reality systems. The mixed reality device interacts with an outside network and the web (e.g., using a Wi-Fi connection) and also allows for input from the user (e.g., using hand gestures and/or voice commands).

FIG. 3 shows the various databases and the AR/VR session management system 80 as remote applications (i.e., implemented in one or more servers outside of the retail establishment). In one embodiment each of these is accessible via web services (such as RESTful micro-web services) well known to those skilled in the art of distributed databases and mobile services.

In other embodiments, some or all of the data could be located on servers in the retail establishment. FIG. 3 does not suggest any ownership or management policy of the databases or the AR/VR session management system, and the description specifically includes embodiments where functionality of the system of FIG. 3 is divided in arbitrary ways so as to allow ownership and/or management by various parties which may or may not include the retailer as one of those parties.

Referring to FIG. 4, sales promotion application 70 integrates retail-based analytical processing with mixed reality system technology is shown. Described below is a specific implementation of this processing 70, others may be implemented. As a user of the mixed reality device 13a walks through the retail establishment, the location of the user and associated mixed reality device 13a inside the retail establishment is determined and tracked 72 as the user moves around the retail establishment with the mixed reality device 13a.

Tracking 72 may be accomplished through a number of techniques including wireless triangulation of the device, various "internal GPS" technologies (BLE, RFID, NFC, etc.) or dead-reckoning based accelerometer data integration. For the purposes of discussion it is only necessary to note that the physical location of either the mixed reality device 13a (or some other device on the person of the user, e.g., a smartphone) may be estimated to within a few feet of the user's actual location in the retail establishment using technologies well known to those skilled in the art. Depending on the technology used to track the location of the mixed reality device 13a (or the user), other technology components such as cameras, beacons, and other access points may be used. These components have been omitted from FIG. 3 and are not specifically referred to in FIG. 4, for simplicity.

In the case where the actual device being tracked is not the mixed reality device, but rather some other device (such as a smart phone in the pocket of the user), the tracked device makes its location (and by inference the location of the user and the mixed reality device 13a) known by sending location data over the in-retail establishment wireless network to the AR/VR session manager 80. It should also be noted that the location of the user and mixed reality device 13a may be determined without any location determination functionality on the mixed reality device 13a, and without any second device (i.e., smart phone) if some other outside system (e.g., a video surveillance system with image analytics capabilities able to determine location) is available and is used to track the user's location during the AR/VR session.

The user may also specify where in the retail establishment they are by some other technique such as selecting a location on a map of the retail establishment. In another embodiment the AR/VR system may determine its own location by capturing the image or images of items in its surroundings which have been previously mapped by some to the current location. Using such a location to image map the mixed reality device can determine its own location. The "image" in such a case might be an actual image recorded in some convenient file format, or it might be an index or set of indices derived from the image in a manner which makes them unique to that image (i.e., an image index or hash).

During a session, the user views items and other points of interest in the retail establishment through the mixed reality device 13a. Based on a selected mode of operation into which the session has been placed, the location of the user, and determined orientation of the mixed reality device (i.e., what the device is facing and what items in the physical environment the user is viewing through the device), the AR/VR session manager 80 chooses 74 virtual items and context-relevant information to show to the user on the display of the mixed reality device 13a.

The AR/VR session manager 80 sends 76 the chosen virtual items and context-relevant information to the mixed reality device 13a. The user may view several items in the field of view of the mixed reality device display. The mixed reality device 13a provides a user interface (not shown) that displays menu options that allow the user to highlight a specific item, or a group of items, and display information for a variable period of time which is also selected using the interface menu items. This information is sent 78 to the AR/VR session manager 80. The AR/VR session manager 80 analyzes 80 the user highlight information to drill down to find corresponding content on the specific items highlighted in the display, which is sent to the mixed reality device 13a.

The user interface (not shown) can be used to enter 82 notes as the user reviews the real and virtual objects and information presented in the display of the mixed reality device 13a. While engaged in such a session as, the user may also use standard voice communications or voice-to-chat technology available on the mixed reality device to communicate 84 with a second (remote) user or group of users or compose emails or text messages, etc. These actions may be part of a retail establishment review process with extensive pre-planning or may be impromptu as the user goes through the retail establishment in pursuit of day-to-day managerial responsibilities.

Figure 5:
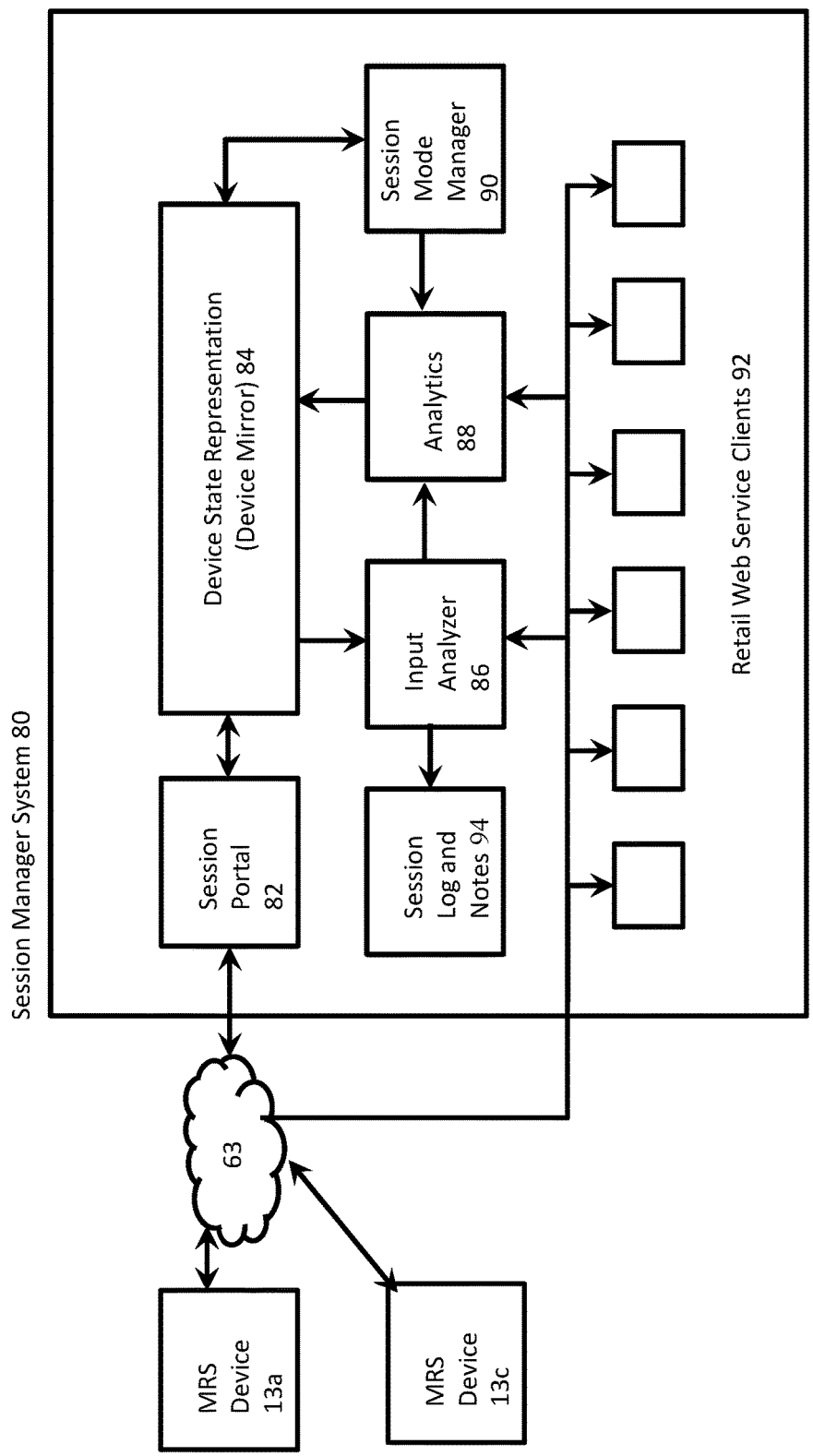
FIG. 5 is a block diagram of an AR/VR session manager.

Referring now to FIG. 5, an AR/VR session manager 80 is shown. The session manager 80 interacts with the mixed reality device 13a over the Internet using a "session portal" 82, e.g., a web service (application programming interface (API) or in another embodiment, a dedicated socket with SMTP or other transfer protocol. The session portal 82 is bi-directional meaning that each of the mixed reality devices (MRS) 13a-13c can send data to the session manager 80 and receive data from the session manager 80. The mixed reality devices (MRS) 13a-13c send updates on their states to the session manager 80. The states of the mixed reality devices 13a-13c are represented virtually or "mirrored" in a device state representation 84 inside the session manager 80.

Input from the mixed reality devices (MRS) 13a-13c to the session manager 80 is used in analytic programs executed on the servers. For example, the camera on the mixed reality device 13a may send an image containing an area showing a retail item with its characteristic consumer brand packaging (by which it is easily recognized by consumers). This part of the image is identified by an input analyzer 86, which relies on image libraries accessible via the web service of the item information database and potentially other databases exposed by the consumer product manufacture, or other web browsers' image analytics services. The input analyzer 86 informs analytical manager 88 with inputs to analytic programs (not shown) executing on the servers 14. The analytics manager 88 uses a current mode and inputs presented to it, in order to decide what to present (virtually) to the user on the device viewer and what to request of the analytics executing on the server. Information presented is produced by the analytics manager using data received from the various analytical programs that execute various analytics both conventional as well as to be developed. The session mode manager 90 monitors the mode selected by the user (as mirrored in the device state representation) and informs the analytics manager of the selection. Information presented is produced by the virtual content manager using data from the various databases accessible via web services attached to the various external retail databases shown, by way of example, in FIG. 8.

In FIG. 5, the session is logged by the input analyzer, including any notes or annotations provided by the user of the mixed reality device (spoken, typed, or sent via some other mode of communication) into session log/notes records 94 that are stored in a database as records. This locale log/record in the session manager 80 may be backed up in an external database (not shown) for long-term storage, reporting, and further analysis. This local session and long-term storage may also include a full record or "recording" of part or all of the session, rather than just the user notes.

The user may also view comparative information for this item relative to other items in the retail establishment, in its inventory category, department, or relative to all items in the retail establishment, or relative to this item or group of items in other retail establishments or groups of retail establishments (e.g., the retail establishment's regional division).

In this embodiment, the user (who may have some managerial responsibility in the retail establishment, but may also be a retail establishment analyst or even a shopper, or some other person interested in analyzing the retail establishment or its products and processes) begins use of system in a "user session" with the mixed reality device 13a initiating the session by a switch on the device, a voice command, and/or a hand gesture. The mixed reality device 13a includes a motion sensor that awakens the device 13a (i.e., loads operating system components and prepares for input) when the device 13a senses motion. The mixed reality device 13a may require input of a user ID and password to enable further operation and interaction with the user. An AR/VR session is initiated by the user via a menu user interface (not shown) of the mixed reality device 13a.

As discussed the mixed reality device 13a operate in various modes, and based on the mode of operation (and the location of the user, and the orientation of the mixed reality device the AR/VR session manager 80 chooses virtual items and context-relevant information to show to the user on the screen.

One mode is a "loss prevention management" mode. In such a mode, the user may approach a particular retail shelf and inspect a retail item, at which time the AR/VR session manager 80 sends information about the item's inventory shrinkage (that is, difference between item sales and item inventory replenishment integrated over a period of time). The user may have several items in their field of view, and the device's user interface may display menu options that allow the user to highlight a specific item, or a group of items, and display information for a variable period of time which is also selected using the interface menu items.

Inventory shrinkage analysis is accomplished when the AR/VR session manager highlights items above some shrinkage threshold (measured in some meaningful metric such as absolute dollars lost, or percent increase in shrinkage over some historical average or benchmark). For example, the user might walk down the aisle of the retail establishment and as they do so, various retail items on the retail establishment shelves come into their (physical) field of view. The Mixed reality device 13a's camera sends these images back to the session manager 80 via the web connection and the session manager identifies the items and compares sales to current inventory levels (as determined by item-level RFID scans or some other real-time or quasi-real-time inventory measurement technology). If the shrinkage or inventory loss level for a particular item in view is in excess of a pre-determined threshold (selected by the user at the beginning of the session, or in some pre-configuration file used during initiation of the session), the item is highlighted in red or outlined in some manner which emphasizes its location on the viewer of the mixed reality device 13a. That is, the item "glows" in some manner in the view of the user. The user may then select the item using voice or hand gestures and, as a result, see more detailed information such as shrinkage data, shrinkage calculation input data, historical shrinkage data, comparisons of this data to data from other retail establishments, retail categories, competing brands, and so forth.

Another mode is a comparative mode, where the user may view comparative information for an item relative to other items in the retail establishment in its inventory category, department, or relative to all items in the retail establishment, or relative to this item or group of items in other retail establishments or groups of retail establishments (e.g., the retail establishment's regional division).

Another mode, as mentioned above allows the user to use the device interface to enter notes as the user reviews the real and virtual objects and information presented.

Another mode, as mentioned above allows the user to use the device while engaged in such an AR/VR session to use standard voice communications or voice-to-chat technology available on the mixed reality devices to communicate with a second (remote) user or group of users about what they are seeing and thinking, or to compose emails or text messages for immediate or future sending.

The above mentioned application involves the session manager when in loss prevention management mode. Other modes might include "merchandising mode" or "planogram mode" in which the items in view of the user are studied with respect to their location on the shelf and in the retail establishment, and how that relates to quality of sales. Optionally the session manager could operate in generic or "mixed" mode in which any unusual information about an item is virtualized as some visual object and presented to their view. Specifically, and using merchandising mode as an example, the user might consider an item in view, and highlight it with a hand gesture or voice command. The device's user interface might then give graphics showing excursion above or below anticipated sales for a selected period of time, sales comparisons with other directly competing brands, other items in the sales category, the same item in other retail establishments in the vicinity, region, or nation, or comparisons with other sales benchmarks. A very valuable comparison is the comparison of sales (turnover frequency) of that item in its current shelf location, compared with sales in other past locations in the same retail establishment. As in the case of the inventory shrinkage mode, the user may not need to select specific items when doing a retail establishment analysis in merchandising mode. That is, the user may simply walk up and down the retail establishment aisles and as exceptional items come into the field of view, the AR/VR session manager notes their exceptionality with respect to one of the metrics and benchmarks mentioned above and highlights the item in the field of view in the mixed reality device viewer.

Another application involves the analysis of the effectiveness of sales promotions. When in the merchandising mode or perhaps a special promotions analysis mode, the user can view an item and see projected by the AR/VR session manager onto the device screen information related to sales (turnover frequency) relative to changes in retail price over selectable periods of time (in this retail establishment or a collection of comparable retail establishments).

A particular application of the AR/VR system related to retail establishment promotions is its correlation to foot traffic in each aisle. As the user stands in a given location in an aisle, he or she should be able to see (based on menu selections via the device's user interface) dwell time in front of each shelf location (of a selected area size, over a selected period of time) as a function of particular promotions. For instance, the spot on the floor might show various shades of green or red depending on whether foot traffic is a little or a lot above or below normal during the promotions period of the selected retail item.

The AR/VR system may also generate a highlight on an area rendered in the mixed reality device, where a retail establishment promotion is supposed to be in place at a given date and time, but is not in place. For example, a promotion may be scheduled to be on an aisle end-cap at 9:00 am on Tuesday. If the promotion is not in place at the location and scheduled time, the AR/VR system can generate an alert that is rendered on the mixed reality device that could include a description and/or image of the missing promotion and a proposed email or text to the person in the retail establishment responsible. Using this function, and similar functionality related to planned advertising, price changes, warnings, and so forth, the user may simply walk through the retail establishment and see (and record for later viewing, logging, or reporting) visual representations of differences between the actual and intended state of the retail establishment.

In another embodiment, the system of FIGS. 3 and 5 and the application (FIG. 4) described above are enhanced using an (artificial intelligence based) cognitive assistant.

Figure 6:
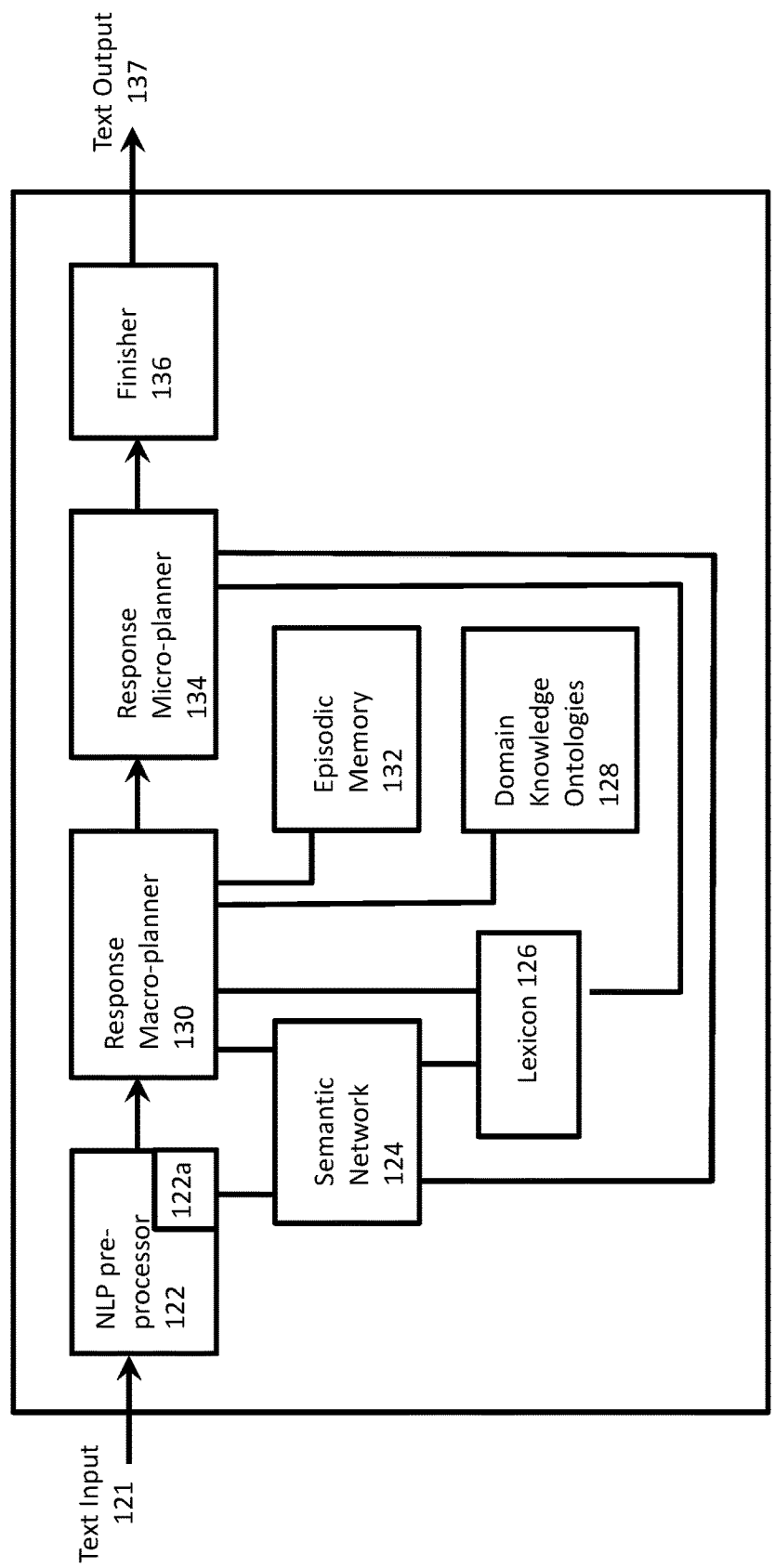
FIG. 6 is a block diagram of an AI based cognitive agent.

Referring now to FIG. 6, a cognitive agent 120 is shown. The cognitive agent 120 is an example of one way of implementing such an agent. That is, those skilled in the art of expert systems, natural language processing (NLP) based cognitive agents, and similar AI based agents will be able to immediately envision various permutations of an agent which enables the applications described below.

Input text 121 (such as a question: "Has shrinkage for this item increased more than expected this month?") enters the cognitive agent via the NLP pre-processor 122. In voice based input embodiments, voice data are converted to text by a voice to text sub-system 122*a* using standard voice recognition technology. The NLP pre-processor 122 parses the sentence into "tagged" words and phrases (i.e., the NLP pre-processor 122 labels each word with its part of speech such as "noun", "verb-transitive", and so forth). The output of the pre-processor 122 is a first data structure that represents the input text with words and phrases connected to each other and annotated with indicators of meaning (or "sense" or "context") pointing to the words and phrases. These meanings are extracted or determined using statistics and pattern based comparisons to a semantic network 124, which along with the lexicon 126, retail establishments, includes the cognitive agent's knowledge base of language (domain knowledge ontologies 128).

The representation of the input text (e.g., the first data structure with determined meanings) is passed to a response macro-planner 130 that determines information content of a response from the cognitive agent 120. The macro-planner 130 can use non-monotonic planning with default logic and patterns or templates (from episodic memory 132) and also domain knowledge 128 to produce a second data structure that contains the response. This data structure does not contain "sentences" per se, but rather concepts and concept qualifiers (for time, quantity, type and degree of emphasis, etc.) that together comprise the logic behind the response from the cognitive agent 120. This second data structure is passed to a micro-planner 134 that produces sentences from the second data structure for the response from cognitive agent 120 using the language knowledge contained in the lexicon 126 and semantic network 124. The sentences can be "polished," e.g., corrected, for grammar, (e.g., tense, singular/plural matching, etc.) in a finisher 136 that outputs text output 137. Domain knowledge ontologies and episodic memory may be enhanced over time as the cognitive agent is given new information, and as old faulty information is corrected. That is, these can be written to selectively by "actuator" functionality in an extension of the response macro-planner.

The AR/VR session manager 80 may generate input text that is sent directly to the cognitive agent 120 in order to apprise the cognitive agent of the context of the conversation with the user of the mixed reality device 13*a* and resolve any ambiguities. For instance, when the user asks the cognitive agent 120: "Has shrinkage for this item increased more than expected this month?" the cognitive agent 120 may not know to what "this" refers, and will also not know the time period in question without further information. The agent could ask the user for time and item ID clarification, but it is more convenient for the user if the cognitive agent 120 is passed information directly from the session manager 80 about the item that is highlighted, and what time period is selected or configured. The session manager 80 makes the session state visible to the cognitive agent 120, via a web-service that is not controlled by or visible to the user.

The knowledge base of the cognitive agent may be specifically trained for the particular retailer's markets, key customer base and associated demographics, item types and uses, and any other knowledge categorization which makes it easier for the agent to narrow questions and better interpret the intention behind the user's questions. There are many questions that might be asked by the user of the mixed reality device 13*a* of the cognitive agent 120.

Using the cognitive agent 120, the sales promotion application 70 can be enhanced as the cognitive agent 120 allows the user to ask questions directly through the mixed reality device 13a, which are sent as input to the AR/VR session manager system 80 (see FIG. 7).

The user can considers an item and the accompanying information on sales vs. promotional price and can drill down to ask the cognitive agent 120 (via the voice-to-chat interface) various questions such as:

(1) What was overall retail establishment performance like in this retail establishment over the same period of time?

(2) What was the weather like?

(3) What were overall retail sales (in grocery, or apparel, or whatever category) like over the same period of time, relative to the previous year?

(4) What was the foot traffic in this particular aisle of the retail establishment, during the top six shopping hours of each Saturday, for the 10 Saturdays previous to the beginning of the promotion, and for each Saturday during the current promotion, and is there a statistically meaningful correlation between that traffic change and the promotion?

These are merely examples of questions that could be asked, as there are many other questions that might be asked of the cognitive agent 120. The cognitive agent 120 is made sufficiently flexible in its ability to process and interpret natural language, and it is sufficiently broad in its retail practices knowledge base that it can answer many and any such questions without requiring an enumeration and "hard coding" of specific questions.

The cognitive agent 120 answers these questions by use of an Artificial Intelligence platform that takes the output of the cognitive agent 120 and parses words in the output. Such capability has been demonstrated to a limited extent by the Apple Siri platform, and to a much greater extent by IBM's Watson AI engine and IPSoft's Amelia cognitive agent. The cognitive agent 120 can answer an actual question "where has shrinkage increased over the prior month" by session manger system 80 having a sub system "input analyzer 86a" that processes input from the cognitive agent 120 and recognizes that shrinkage is being asked accesses current and historical data, calculates the shrinkage if any and delivers the calculated analytics back to the cognitive 120 to place that value into a sentence that is rendered back to the user.

Another embodiment involves the visual correlation of item sales. For example, if the user of the mixed reality device 13a highlights a particular item on a shelf or display, the device 13a may show all items in the vicinity whose sales correlate most closely with the selected item. Another embodiment specifically includes an application of the described system in which the sales, shrinkage, or associated foot traffic correlations for a particular retail item or group of items is shown to the user, via the mixed reality device 13a, for various alternative retail establishment layouts including but not limited to the current (physical) retail establishment layout. The user or users engage in collaborate session to compare retail establishment performance impacts for those layouts, and investigate (particularly when the cognitive agent 120 is used) deep implications of retail data analytics applied to retail establishments with varying retail establishment layouts that are shown visually on the mixed reality device 13a.

Also are embodiments in which a previously recorded session for a particular retail establishment is replayed to simulate the retail establishment visit for the original user or a new user. One such embodiment includes the case where images are captured (for example, while the user walks through the retail establishment) and data/information virtualization and projection is applied later to produce the augmented walk-through session. Another embodiment includes a session (produced by any of the techniques described above) involving a series of real and virtual objects presented in the session, with subsequent application of the cognitive agent 120 to answer user questions and record user thoughts and expertise as the user watches the previously recorded session. That is, the cognitive agent 120 generates a data structure that represents the answer to the question in the voice input. The cognitive agent 120 determines the meaning of the question and forms queries to execute merchandizing algorithms that answer the question, and packages the answer into text that is rendered to the user.

Servers can be any of a variety of computing devices capable of receiving information, such as a server, a distributed computing system 10, a rack-mounted server and so forth. Server may be a single server or a group of servers that are at a same location or at different locations. Servers can receive information from client device user device via interfaces. Interfaces can be any type of interface capable of receiving information over a network, such as an Ethernet interface, a wireless networking interface, a fiber-optic networking interface, a modem, and so forth. Server also includes a processor and memory and a bus system including, for example, an information bus and a motherboard, can be used to establish and to control information communication between the components of server.

Processor may include one or more microprocessors. Generally, processor may include any appropriate processor and/or logic that is capable of receiving and storing information, and of communicating over a network (not shown). Memory can include a hard drive and a random access memory storage device, such as a dynamic random access memory computer readable hardware storage devices and media and other types of non-transitory storage devices.

Embodiments can be implemented in digital electronic circuitry, or in computer hardware, firmware, software, or in combinations thereof. Computer programs can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and information from a read-only memory and/or a random access memory. Generally, a computer will include one or more mass storage devices for storing information files; such devices include magnetic disks, such as internal hard disks and removable disks; magneto-optical disks; and optical disks. Storage devices suitable for tangibly embodying computer program instructions and information include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. For example remote users may use instead of a mixed reality device and session manager as described above, a computer application with a graphical user interface that projects some version or portrayal of the in-retail establishment user's screen and displayed information. Other embodiments therefore are within the scope of the following claims.

What is claimed is:

1. A system comprises:
a server system comprising:
one or more processor devices;
memory in communication with the one or more processor devices; and
a storage device that stores a program of computing instructions for execution by the processor using the memory, the program comprising instructions configured to cause the processor to:
receive images from a mixed reality device, which images including representations of physical objects;
receive voice data from the mixed reality device;
execute a cognitive agent to process the voice data received from the mixed reality device with the cognitive agent including:
a natural language process pre-processor that parses text input into tagged words and phrases to provide a first data structure that represents the text input with words and phrases connected to each other and annotated with indicators of meaning;
a response macro-planner that determines information content of a response from the representation of the text input to produce a second data structure that contains the response in a form that contains concepts and concept qualifiers that comprise logic behind the response; and
a micro-planner that produces sentences from the second data structure for the response from the cognitive agent;
determine location information to determine a correspondence between the representations of the physical objects in the images and stored information concerning the set of physical objects;
generate a set of virtual objects that include data describing merchandising process concepts regarding the set of physical objects, based on input queries received in the voice data; and
send the set of virtual objects to the mixed reality device.

2. The system of claim 1 comprises:
a voice to text translator.

3. The system of claim 1 wherein the processor configured to execute the cognitive agent is further configured to:
receive user inputs regarding the physical objects.

4. The system of claim 3 wherein the received user inputs regarding the physical objects are highlights applied to a selected one or more of the physical objects.

5. The system of claim 1 wherein the processor, configured to execute the cognitive agent, is further configured to:
analyze user inputs; and
resolve ambiguities in the user inputs by accessing data directly from the mixed reality device, which data specifies the physical objects by having a highlight applied on the specified one of the physical objects.

6. The system of claim 1 wherein the cognitive agent is configured to:
receive voice input in the form of a question regarding a product displayed in the mixed reality device;
generate a structure that represents an answer to the question in the voice input, by executing the cognitive agent to determine meaning of the question and forming queries to execute merchandizing algorithms that answer the question.

7. The system of claim 6 wherein the server system is further configured to:
send the answer to the mixed reality device.

8. The system of claim 6 wherein the server system is further configured to:
execute one or more merchandizing algorithms that apply the data derived from the question and that apply data corresponding to one or more merchandizing parameters associated with the set of physical objects to provide as the output data one or more merchandizing values associated with one or more of the physical objects in a view of the set of physical objects.

9. A computer implemented method, the method comprising:
receiving by a server system, images from a mixed reality device, which images including representations of physical objects;
receiving by a server system, voice data from the mixed reality device;
processing by a server system, the voice data received from the mixed reality device with a cognitive agent with processing further comprising:
parsing by a natural language process pre-processor text input into "tagged" words and phrases to provide a first data structure that represents text input with words and phrases connected to each other and annotated with indicators of meaning;
determining by a response macro-planner information content of a response from the representation of the text input to produce a second data structure that contains the response in a form that contains concepts and concept qualifiers that comprise logic behind the response; and
producing by a micro-planner sentences from the second data structure for the response from the cognitive agent;
determining by a server system, location information to determine a correspondence between the representations of the physical objects in the images and stored information concerning the set of physical objects;
generating by a server system, a set of virtual objects that include data describing merchandising process concepts regarding the set of physical objects, based on input queries received in the voice data; and
sending by a server system, the set of virtual objects to the mixed reality device.

10. The method of claim 9, further comprising:
executing by the server system the cognitive agent.

11. The method of claim 9, further comprising:
analyzing by the server system user inputs; and
resolving by the server system ambiguities in the user inputs by accessing data directly from the mixed reality device, which data specifies the physical objects by having a highlight applied on the specified one of the physical objects.

12. The method of claim 9, further comprising:
receiving by the server system voice input in the form of a question regarding a product displayed in the mixed reality device;
generating by the server system a structure that represents an answer to the question in the voice data, by executing the cognitive agent to determine meaning of the question and forming queries to execute merchandizing algorithms that answer the question; and executing by the server system one or more merchandizing algorithms that apply the data derived from the question and that apply data corresponding to one or more merchandizing parameters associated with the set of physical objects to provide as the output data one or more merchandizing values associated with one or more of the physical objects in a view of the set of physical objects.

* * * * *